J. H. MUTH.
THREADING TAP.
APPLICATION FILED OCT. 17, 1919.
1,365,338.
Patented Jan. 11, 1921.
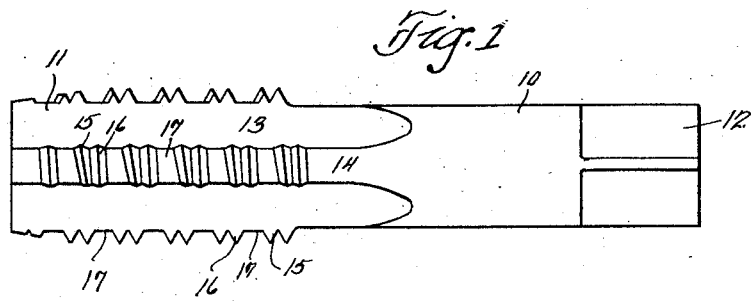
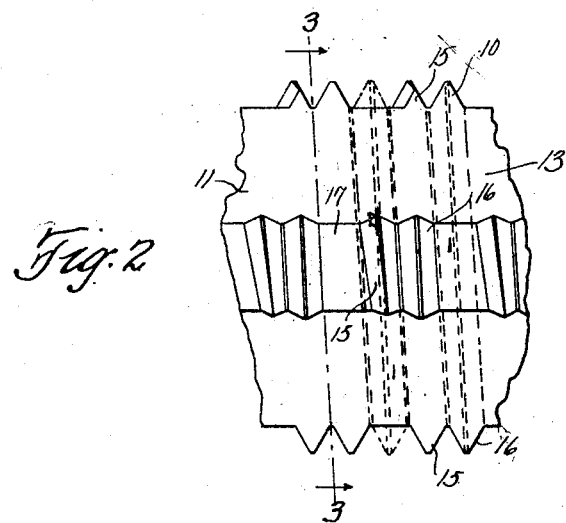
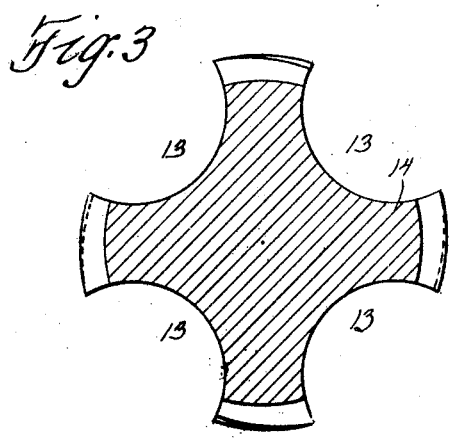
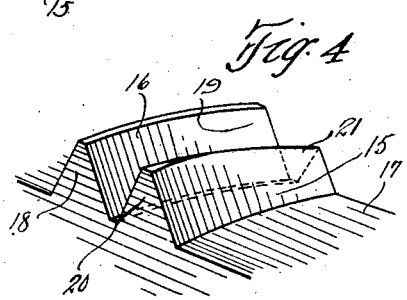
Inventor
John H. Muth
By Bates & Macklin,
Attys.

UNITED STATES PATENT OFFICE.

JOHN H. MUTH, OF EAST CLEVELAND, OHIO, ASSIGNOR OF ONE-HALF TO THE ELWELL PARKER ELECTRIC COMPANY, OF CLEVELAND, OHIO, A CORPORATION OF OHIO.

THREADING-TAP.

1,365,338.

Specification of Letters Patent.

Patented Jan. 11, 1921.

Application filed October 17, 1919. Serial No. 251,369.

*To all whom it may concern:*

Be it known that I, JOHN H. MUTH, residing at East Cleveland, in the county of Cuyahoga and State of Ohio, have invented a certain new and useful Improvement in Threading-Taps, of which the following is a full, clear, and exact description, reference being had to the accompanying drawings.

My invention relates to improvements in threading taps.

An object of the present invention is to provide an improved tap which will give longer service and be less liable to breakage than existing taps, and will not bind in a hole out of line with the tap.

Another important object is to reduce friction and consequent heating during use by the removal of certain portions of the wearing surfaces of existing taps.

Still another object is to provide an improved tap that may be cheaply manufactured.

The above objects will become more clear in the following description in which still further objects appear and in which the invention is more fully described, reference being had to the accompanying drawings. The essential characteristics of my invention are summarized in the claims.

In the drawings, Figure 1 is a side elevation of a tap constructed in accordance with my invention; Fig. 2 is an enlarged detail of the same; Fig. 3 is a section taken approximately on the line 3—3 of Fig. 2; and Fig. 4 is an enlarged perspective view showing my improved tooth construction.

Referring to the drawings by reference numerals, my invention is embodied in a tap 10 which may have the usual shank shown as angular at 12. The bit portion is shown as tapered at the end 11. The thread cutting teeth are cut as a helical thread in the usual manner and then fluted as at 13 to leave cutting teeth on the intervening lands 14. The teeth are provided with the usual clearance or relief back of the forward or cutting edges in any manner desired.

Having provided a tap of common form, my invention resides in the removal of certain teeth and the modification of certain remaining teeth whereby the objects above set forth may be attained. In carrying out my invention, I remove, by cutting or grinding away, certain teeth preferably in regular order from each land 14, and modify certain remaining teeth, also in regular order, by cutting or grinding to provide greater clearance, whereby novel relationship between removed, modified and normal teeth is attained.

The selection of teeth to be removed and of others to be modified may be varied according to the various predominant uses with certain materials to which the tap may be put. From my experience, I have found an arrangement as illustrated in the drawings to give the best results in ordinary use.

As will be apparent from the drawings, I have shown every third tooth of each land 14 removed, leaving groups of two teeth each, remaining between the spaces 17, formed by the removal of the teeth. One tooth 16 of each group, having a forward cutting edge 18 and a heel 19 of slightly less height on the diameter of the tap to provide the usual relief or clearance, is left untouched in its form as existing in the tap of common use. The other tooth 15 of each group has the usual cutting edge 20, of the normal size equal to the teeth 16, but the portion behind the cutting edge is cut or ground away to provide additional clearance as is clearly shown at 21 in Fig. 4, it being observed that the tooth is reduced both in width and height uniformly from the forward cutting edge 20 to the rear portion of the tooth.

In both Figs. 1 and 2 which show different cutting portions 14 in front and edge views, the relationship between the arrangement of teeth on each cutting portion with that on the portions immediately preceding and following will be clear.

In Fig. 2 which is enlarged and shows in dotted lines the path of the near half of the helix, parts of which constitute teeth of the tap, the preferred arrangement of teeth 15 and 16 and spaces 17 will be most easily followed. Beginning at the left of this figure which is toward the lead end of the tap, with the first threaded portion of the helix indicated by dotted lines, a space 17 (the removed tooth lying in these dotted lines) in the land 14 shown in edge view at the top of this figure is followed, tracing along the helix, by a tooth 15 in the land 14 in front view which in turn is followed by a space 17 in the land 14, shown in edge view at the bottom of the figure. The portions of the next thread visible immediately to the right of the one just traced, consist of a tooth 15 in edge view at the top, a tooth 16 in front view and a tooth 15 in edge view at the bottom. In the next thread (of the former helix) to the right appears in the same order a tooth 16, a space 17 and a tooth 15. It will be understood of course that one land 14 is directly opposite and therefore invisible behind the one shown in front view in this figure and that this cutting element has the elements 15, 16 and 17 appropriately positioned in the path of the helix not visible.

The particular character of clearance is varied in the manufacture of taps with a view to securing more effective operation on different kinds of material, and it is my intention in embodying my inventions on various taps to leave undisturbed the character of relief of some of the teeth remaining after the removal of others of the teeth, but I find most effective results for general use comes from arranging the teeth as above described and the particular character of relief I prefer to give to the teeth with additional clearance above referred to is illustrated in the drawings, particularly in the perspective view, Fig. 4. At their cutting edges these teeth have full height and width. The sloping side toward the shank is untouched, leaving a surface which is parallel to the corresponding surface of the adjacent tooth. The other side is cut or drawn away uniformly, while preserving its 60° angle to the axis (or other angle if not a standard thread) from the base to the top, leaving a surface which converges toward the other as this surface approaches the heel of the tooth. The result is that greater relief or clearance is given on the lee side of this tooth, which, at its cutting edge is the full size of the groove to be formed. The top or ridge of the tooth slopes inwardly, as appears clearly in Figs. 3 and 4, while the angle at which it converges with relation to the helix is illustrated particularly in Fig. 2. In providing this extra or additional relief only one surface need be operated on. The reduction of the height of the tooth at the heel is incidental and due to the intersection of this surface with the opposite sloping surface of the same tooth.

In actual practice in a large manufacturing establishment I have conducted tests and made close observations of experiences with taps, and find that in all ordinary work the number of holes to be threaded with a given number of taps is limited much more by breakage than by wear on the taps. Experience has demonstrated that removal of certain teeth increases the average number of holes a tap is capable of threading, and I also find that with a given number of taps constructed in accordance with my invention a very much greater number of holes may be threaded than with the standard form of taps.

I am aware that it is old to remove certain teeth of a tap, and I am also aware that it is old to vary the shape and arrangement of the teeth uniformly in any given tap from that described as the usual construction, but I believe that I am the first to remove certain teeth of a tap and modify certain of the remaining teeth in the manner as described and set forth in the following claims.

Having thus described my invention, what I claim is:

1. In a threading tap having a plurality of lands separated by flutes, teeth spaced unequally but in multiples of the pitch and having unequal clearances.

2. A tap having a land comprising a plurality of teeth separated into groups by a plurality of spaces, certain of said teeth having more relief than others.

3. In a threading tap comprising a tapered cylinder, having a helical thread thereon, and having fluted portions removed and teeth formed from the remaining portions of the helix, spaces formed therein by the removal of certain teeth at regular intervals, and certain of the remaining teeth in regular sequence along the helix having more clearance than others.

4. In a threading tap having helical teeth, a space in one land being preceded and followed in the helical path in adjacent lands by teeth having clearance greater than normal.

5. In a tap having helical teeth, a tooth in one land being preceded and followed in the helical path in adjacent lands by teeth having clearances greater than normal.

6. In a threading tap, a land having a tooth arrangement comprising a tooth of minor clearance, a tooth of major clearance, and a space.

7. A tap having a plurality of lands, each land having a third of the teeth removed, half of the remaining teeth having greater clearance than the others.

8. A tap having the teeth removed at regular intervals along each land, forming spaces, the teeth on either side of each space being provided with different clearances.

9. A tap having a third of its tooth space on each land provided with teeth of minor clearance, a third with teeth of major clearance, and a third with spaces formed by the removal of teeth.

10. A tap having a portion of its effective teeth on each land of a clearance different from that of the remainder.

11. A tap having half of its effective teeth with the portion behind the cutting edge reduced in size to form a clearance different from that of the remaining teeth.

12. A tap having a part of its tooth space provided with teeth of minor clearance, and a part with teeth of major clearance, said major clearance being formed by uniformly reducing one face of the tooth behind the cutting edge.

In testimony whereof, I hereunto affix my signature in the presence of two witnesses.

JOHN H. MUTH.

Witnesses:
 FRED J. HEISS,
 L. I. HOLT.